(12) United States Patent
Shirai et al.

(10) Patent No.: US 9,643,893 B2
(45) Date of Patent: May 9, 2017

(54) METHOD OF MANUFACTURING JOINT BODY OF CONDUCTIVE CERAMIC BODY AND METAL BODY

(71) Applicant: DENSO CORPORATION, Kariya, Aichi-pref. (JP)

(72) Inventors: Hideaki Shirai, Anjo (JP); Tomohiro Shimizu, Gifu (JP); Yasuyuki Ookouchi, Toyota (JP)

(73) Assignee: DENSO CORPORATION, Kariya (JP)

( * ) Notice: Subject to any disclaimer, the term of this patent is extended or adjusted under 35 U.S.C. 154(b) by 413 days.

(21) Appl. No.: 14/491,378

(22) Filed: Sep. 19, 2014

(65) Prior Publication Data

US 2015/0083316 A1 Mar. 26, 2015

(30) Foreign Application Priority Data

Sep. 20, 2013 (JP) ................. 2013-195878

(51) Int. Cl.
*C04B 37/02* (2006.01)
*H05B 3/14* (2006.01)
*H05B 3/42* (2006.01)
*C04B 37/00* (2006.01)

(52) U.S. Cl.
CPC .......... *C04B 37/021* (2013.01); *C04B 37/005* (2013.01); *H05B 3/141* (2013.01); *H05B 3/42* (2013.01); *C04B 2237/083* (2013.01); *C04B 2237/36* (2013.01); *C04B 2237/365* (2013.01); *C04B 2237/403* (2013.01); *C04B 2237/80* (2013.01); *C04B 2237/84* (2013.01); *H05B 2203/023* (2013.01)

(58) Field of Classification Search
CPC ........ H05B 3/141; H05B 3/42; C04B 37/021; B32B 37/06
See application file for complete search history.

(56) References Cited

U.S. PATENT DOCUMENTS

| 3,256,598 A * | 6/1966 | Kramer et al. ........ B23K 11/00 |
| | | 156/273.7 |
| 5,837,791 A | 11/1998 | Sagane et al. |
| 2008/0199709 A1 | 8/2008 | Ishiwata et al. |
| 2008/0304959 A1 | 12/2008 | Benoit et al. |
| 2013/0216842 A1 | 8/2013 | Kawamoto et al. |

FOREIGN PATENT DOCUMENTS

| JP | 7-247177 | 9/1995 |
| JP | 2008-202092 | 9/2008 |
| JP | 2009-518270 | 5/2009 |
| JP | 2013-170090 | 9/2013 |

* cited by examiner

*Primary Examiner* — Daniel McNally
(74) *Attorney, Agent, or Firm* — Nixon & Vanderhye P.C.

(57) ABSTRACT

A method of manufacturing a joint body of a ceramic body and a metal body includes a step of joining them together by passing a current to an abutment surface between them. The joining step includes a step of heating up the abutment surface to a temperature T1 within a temperature range between (Tr-220)° C. and (Tr-50)° C. in a period longer than 10 seconds, Tr being a recrystallization temperature of the metal body, a step of heating the abutment surface for a period longer than 5 seconds at a temperature T2 within a temperature range between Tm×0.3° C. and Tm×0.45° C., Tm being a melting point of the metal body, and a step of heating the abutment surface for a period longer than 3 seconds at a heating temperature higher than Tm×0.48° C. and lower than Tm×0.6° C.

7 Claims, 5 Drawing Sheets

US 9,643,893 B2

METHOD OF MANUFACTURING JOINT BODY OF CONDUCTIVE CERAMIC BODY AND METAL BODY

This application claims priority to Japanese Patent Application No. 2013-195878 filed on Sep. 20, 2013, the entire contents of which are hereby incorporated by reference.

BACKGROUND OF THE INVENTION

1. Field of the Invention

The present invention relates to a method of manufacturing a joint body of a ceramic body and a metal body by electrical heating.

2. Description of Related Art

Since ceramics are difficult to form into a complicated shape, they are joined to metal which is easy to machine to obtain a desired component or a part. On the other hand, it is known to use a joint body of ceramic and metal for a heater having a ceramic element which generates heat when applied with a current.

As a method of joining metal and ceramic parts, furnace brazing is widely used. For example, Japanese Unexamined Patent Application Publication (Translation of PCT Application No. 2009-518270) describes an assembly formed by successively attaching a metal piece, an intermediate piece and a ceramic piece by brazing. In this assembly, the intermediate piece serves to change the thermal expansion coefficient stepwise.

However, the brazing material used has a weakness in creep resistivity under high temperature environment. Therefore, joint bodies of ceramic and metal could not be used for purposes assumed to be exposed to high temperature. Vehicle-mounted parts are required to withstand high temperature of over 500° C. to address strengthening of exhaust gas regulation of motor vehicles, which requires increase of exhaust gas temperature. Therefore, joint bodies manufactured using brazing material are not suitable for vehicle-mounted parts. It is possible to join metal and ceramic together directly by heating. However, in this case, there is a concern that cracks may occur in the ceramic.

SUMMARY

An exemplary embodiment provides a method of manufacturing a joint body of a conductive ceramic body and a conductive metal body including:

an abutting step of abutting the ceramic body and the metal body on each other; and a joining step of joining the ceramic body and the metal body to each other by applying a voltage between the ceramic body and the metal body to pass a current to an abutment surface between the ceramic body and the metal body to thereby heat the abutment surface, wherein the joining step includes:

a first electrical heating step of heating up the abutment surface to a predetermined temperature T1 within a temperature range between (Tr−220)° C. and (Tr−50)° C. in a period longer than 10 seconds, Tr being a recrystallization temperature of the metal body;

a second electrical heating step of increasing the temperature of the abutment surface from the temperature of T1 and heating the abutment surface for a period longer than 5 seconds at a predetermined temperature T2 within a temperature range between Tm×0.3° C. and Tm×0.45° C., Tm being a melting point of the metal body; and a third electrical heating step of increasing the temperature of the abutment surface from the temperature of T2 and heating the abutment surface for a period longer than 3 seconds at a heating temperature higher than Tm×0.48° C. and lower than Tm×0.6° C.

According to the exemplary embodiment, there is provided a method which enables manufacturing a joint body of a ceramic body and a metal body having a high joining strength while preventing occurrence of cracks in the ceramic body.

Other advantages and features of the invention will become apparent from the following description including the drawings and claims.

PREFERRED EMBODIMENTS OF THE INVENTION

Figure 1:
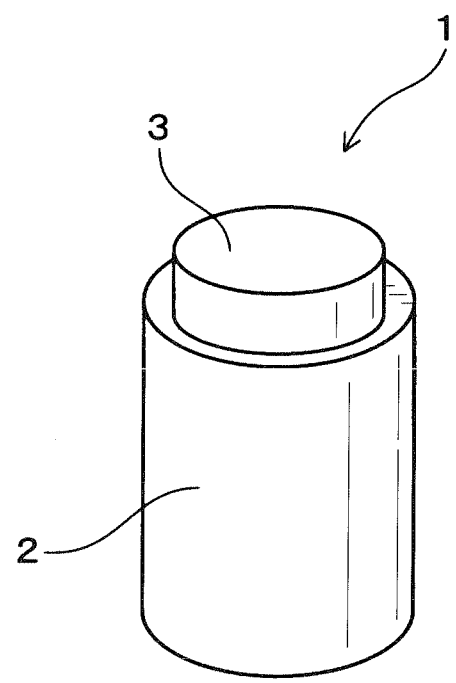
FIG. 1 is a perspective view of a joint body of a ceramic body and a metal body manufactured by a method according to a first embodiment of the invention.
Figure 2:
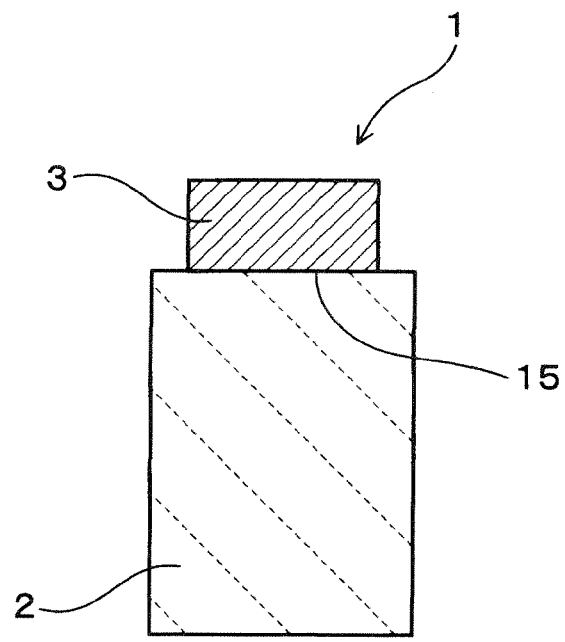
FIG. 2 is a cross-sectional view of the joint body of the ceramic body and the metal body.

In the below described embodiments, the same or equivalent parts or members are indicated by the same reference numerals.

First Embodiment

A method of manufacturing a joint body 1 of a ceramic body 2 and a metal body 3 is described as a first embodiment of the invention with reference to FIGS. 1 to 6. The ceramic body 2 is made of a SiC—Si composite material in which Si is impregnated in SiC, and has electrical conductivity. The metal body 3 is made of Ti, and has electrical conductivity. The ceramic body 2 and the metal body 3 have a cylindrical shape. The ceramic body 2 is larger in size than the metal body 3.

There is a diffusion region having a width of several μm (not shown) where ceramic elements of the ceramic body and metal elements of the metal body 3 are diffused into each other in a joint interface 15 of the ceramic body 2 and the metal body 3. The presence of the diffusion region enables the linear expansion coefficient to change stepwise gradually between the ceramic body 2 and the metal body 3. Accordingly, it is possible to prevent occurrence of cracks in the vicinity of the joint interface 15 and in the ceramic body 2. The presence of the diffusion region can be confirmed by using a scanning electron microscope (SEM), for example.

Figure 3:
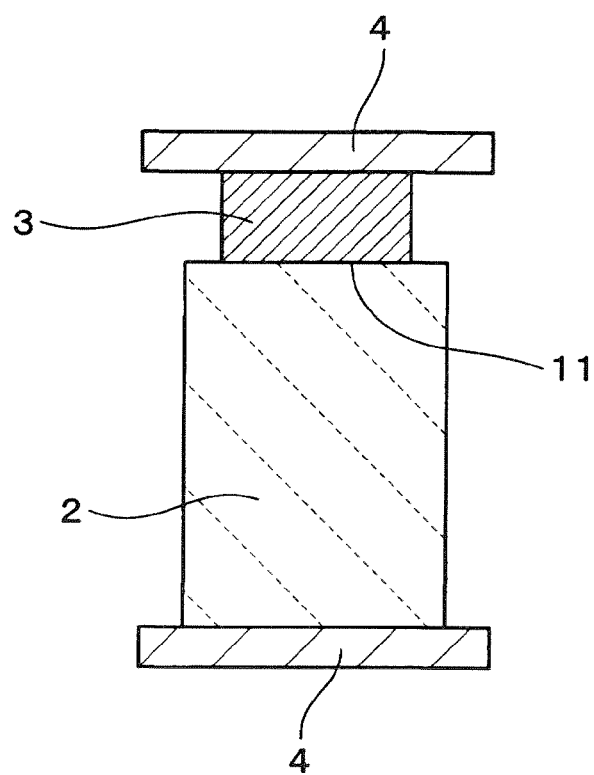
FIG. 3 is a diagram explaining how the ceramic body and the metal body are joined together by electrical heating in the method according to the first embodiment of the invention.

To manufacture the joint body 1, the ceramic body 2 and the metal body 3 are abutted on each other at the beginning as shown in FIG. 3 (an abutting step). Next, the ceramic body 2 and the metal body 3 are held between a pair of electrodes 4, and a voltage from an external power source (not shown) is applied across the electrodes 4 to heat the abutment surface 11 of the ceramic body 2 and the metal body 3. As a result, the ceramic body 2 and the metal body 3 are joined to each other at the abutment surface 11 (a joining step). In this joining step, the heating condition is controlled as described below by controlling the value of a current passed to the abutment surface 11.

At the beginning, the value of the current is set to 0.5 kA to cause the temperature of the abutment surface 11 to start rising. The current value is controlled such that the temperature of the abutment surface 11 rises to $T1°$ C. (T1=300, in this example) in 10 to 15 seconds (a first electrical heating step). When the recrystallization temperature of the metal body 3 made of Ti is Tr (° C.), the temperature T1 is in the range from Tr-220 (° C.) to Tr-50 (° C.).

After that, the current passed to the abutment surface 11 is set to 0.8 to 0.9 kA to further increase the temperature of the abutment surface 11. Subsequently, the abutment surface 11 is heated at the temperature of $T2°$ C. (T2=650, in this embodiment) for 3 to 8 seconds (a second electrical heating step). When the melting point of the metal body 3 made of Ti is Tm (° C.), the temperature T2 is in the range from Tm×0.3(° C.) to Tm×0.45(° C.).

Next, the current passed to the abutment surface 11 is set at 1 to 1.0 to 1.1 kA to further increase the temperature of the abutment surface 11. Subsequently, the abutment surface 11 is heated at the temperature of 820 to 950° C. for at least 4 seconds (a third electrical heating step). In this way, the joint body 1 in which the ceramic body 2 and the metal body 3 are joined to each other at the abutment surface 11 is obtained. The temperature of the abutment surface 11 can be measured by a radiation thermometer, for example. Instead of the temperature of the abutment surface 11, the temperature of part of the ceramic body 2 in the vicinity of the abutment surface 11 may be measured. It was confirmed that there is little difference between these temperatures.

Figure 4:
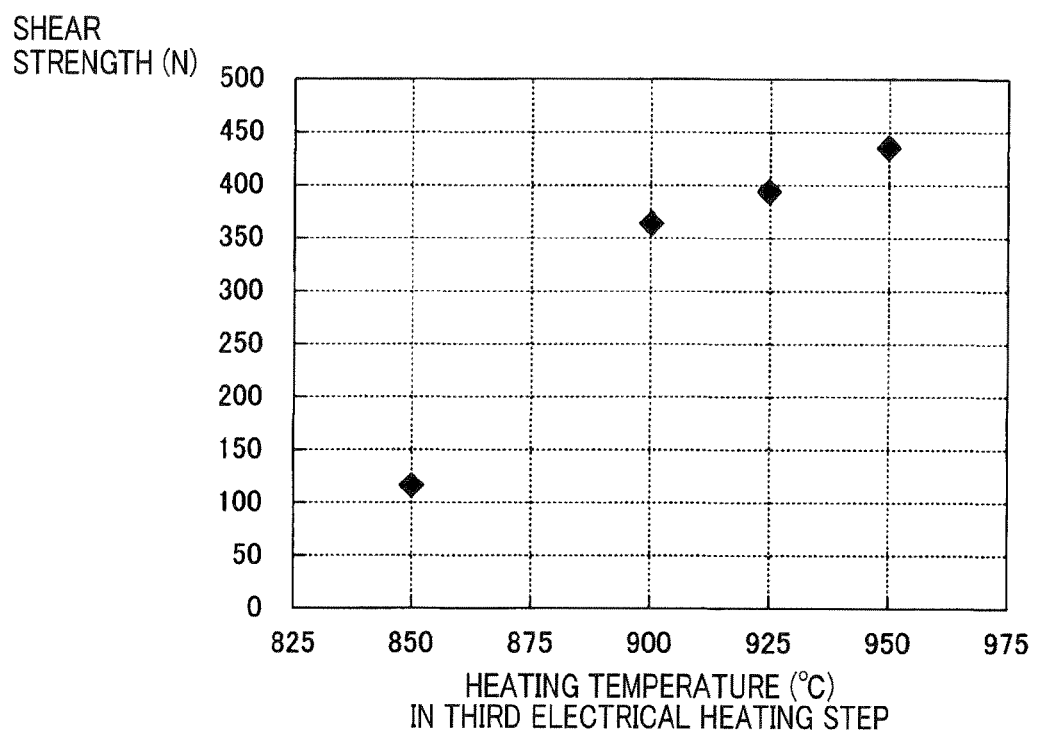
FIG. 4 is a diagram showing a relationship between the shear strength and the heating temperature in a third electrical heating step of the method according to the first embodiment of the invention.

The method of manufacturing the joint body 1 according to the first embodiment WAR performed for each of four cases where the heating temperature is set to 850 (more exactly 820-850 due to temperature control accuracy) ° C. (case 1), 900 (more exactly 875-900 due to temperature control accuracy) ° C. (case 2), 925 (more exactly 900-925 due to temperature control accuracy) ° C. (case 3) and 950 (more exactly 925-950 due to temperature control accuracy) ° C. (case 4), respectively. FIG. 4 shows the shear strength (N) of each of the joint bodies 1 measured using a push-pull gauge for each of case 1, case 2, case 3 and case 4. The shear strength (N) is an average of the measured shear strengths of the three joint bodies 1 manufactured under the same conditions for each of case 1, case 2, case 3 and case 4.

As seen from FIG. 4, in each of case 1, case 2, case 3 and case 4, the shear strength is sufficiently high. That is, the joining strength between the ceramic body 2 and the metal body 3 is sufficiently high and vibration resistant for vehicle mount use. Further, it was confirmed by visual inspection that no cracks are present in the ceramic body 2. In this embodiment where the metal body 3 is made of Ti whose melting point is 1668° C., the third electrical heating step is performed so as to heat the abutment surface 11 in the temperature range higher than Tm×0.48 and lower than Tm×0.6. It was confirmed that it is possible to obtain the joint body of the ceramic body and the metal body having a sufficiently high joining strength and a sufficiently high vibration resistivity for vehicle mount use by performing the third electrical heating step within this temperature range.

On the other hand, when the third electrical heating step was performed setting the heating temperature at 800° C. which is lower than Tm×0.48, the ceramic body and the metal body separated easily from each other. Further, when the third electrical heating step was performed setting the heating temperature at 1010° C. which is higher than Tm×0.6, cracks occurred in the ceramic body. Accordingly, to join the ceramic body and the metal body together so as to have a sufficient joining strength while preventing occurrence of cracks in the ceramic body, the heating temperature in the third electrical heating step is set higher than Tm×0.48 and lower than Tm×0.6. In view of further increasing the joining strength between the ceramic body and the metal body, the heating temperature in the third electrical heating step is preferably higher than Tm×0.5, and more preferably higher than Tm×0.53. In view of preventing occurrence of cracks in the ceramic body more reliably, the heating temperature in the third electrical heating step is preferably lower than Tm×0.58, and more preferably lower than Tm×0.57. More specifically, when the metal body is made of Ti as is the case with this embodiment, the heating temperature in the third electrical heating step is preferably between 820-950° C., and more preferably between 875-950° C.

Figure 5:
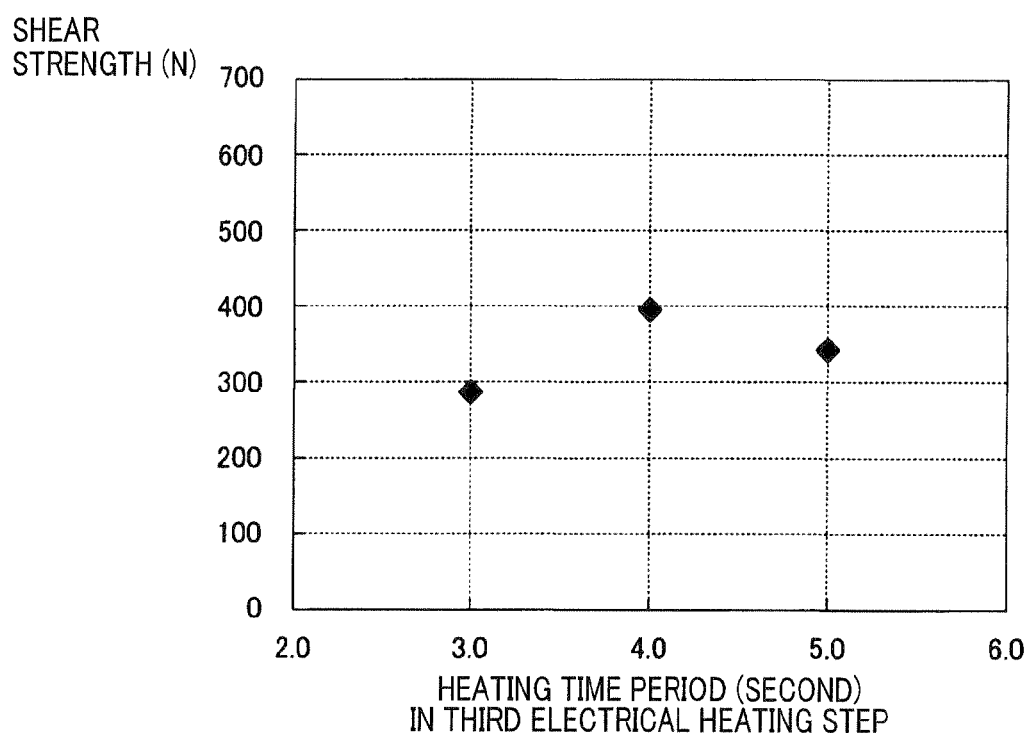
FIG. 5 is a diagram showing a relationship between the shear strength and the heating time period in the third electrical heating step of the method according to the first embodiment of the invention.

Further, the method according to this embodiment was performed changing the heating time period in the third electrical heating step. The abutting step, and the first and second electrical heating step were unchanged from those described above. Specifically, the third electrical heating step was performed at the temperature of 925° C. (900-925° C., more precisely) for each settings of heating time period to 3 seconds, 4 seconds and 5 seconds. FIG. 5 shows the shear strengths of the joint bodies 1 manufactured in accordance with the above three different settings. Each of the shear strengths shown in FIG. 5 is an average of the shear strengths of the three joint bodies 1 manufactured under the same conditions.

As seen from FIG. 5, the shear strength of the joint body is sufficiently high when the heating time period is set longer than 3 seconds. The joining strength does not change so much when the heating time period is changed in the range from 3 to 5 seconds. On the other hand, if the heating time period in the third electrical heating step is shortened too much, there is a concern that the ceramic body and the metal body may not be firmly joined to each other. It was found that when the third electrical heating step was performed setting the heating time period to 2 seconds, the ceramic body and the metal body separate easily from each other. Accordingly, it is preferable to set the heating time period in the third electrical heating step longer than 3 seconds. However, since the productivity is lowered with the increase of the heating time period, it is preferable to shorten the heating time period in the third electrical heating step as much as possible. Accordingly, the heating time period in the third electrical heating step is preferably shorter than 10 seconds, more preferably shorter than 8 seconds, and even more preferably shorter than 5 seconds.

Figure 6:
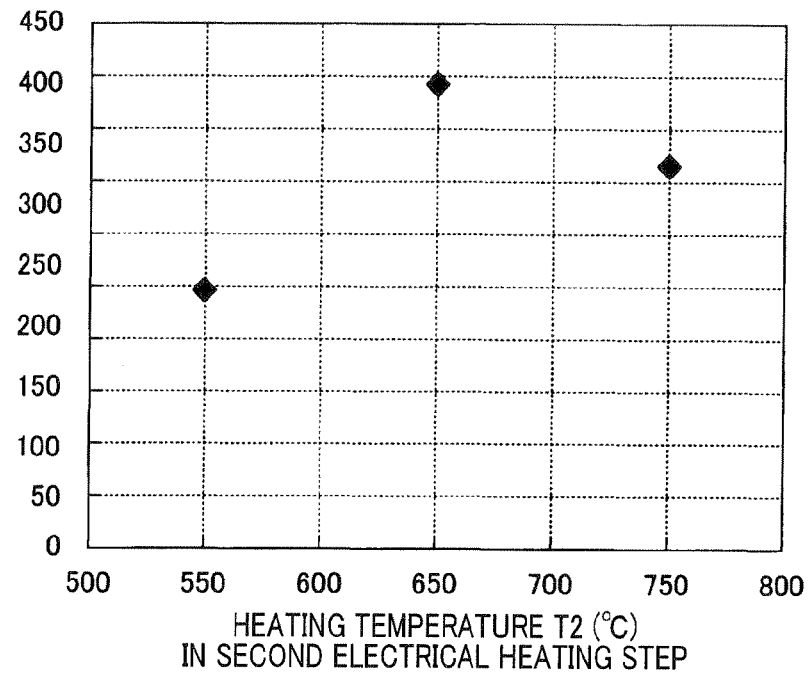
FIG. 6 is a diagram showing a relationship between the shear strength and the heating temperature in a second electrical heating step of the method according to the first embodiment of the invention.

Next, the heating temperature and the heating time period in the second electrical heating step were studied. Specifically, the method of manufacturing the joint body 1 was performed for each of the cases where the heating temperature T2 in the second electrical heating step was set to 550° C., 650° C. and 750° C., respectively. The heating time period in the second electrical heating step was set to 5 seconds. The abutting step and the third electrical heating step were unchanged from those described above. The heating temperature and the heating time period were set to 925° C. and 4 seconds respectively. The joint body 1 was manufactured for each of the three setting where the heating temperature T2 were set to 550° C., 650° C., 750° C. FIG. 6 shows the shear strengths of the joint bodies 1 manufactured in accordance with the above three different settings. Each of the shear strengths shown in FIG. 6 is an average of the shear strengths of the three joint bodies 1 manufactured under the same conditions.

As seen from FIG. 6, for each of the above three settings, the shear strength of the obtained joint body is sufficiently high. That is, the joining strength between the ceramic body 2 and the metal body 3 is sufficiently high for each of the three settings. Further, it was confirmed by visual inspection that no cracks are present in the ceramic body. In this embodiment where the metal body 3 is made of Ti whose melting point is 1668° C., the second electrical heating step is performed so as to heat the abutment surface 11 at the temperature T2 within the temperature range higher than Tm×0.3 and lower than Tm×0.45. It was confirmed that it is possible to obtain the joint body of the ceramic body and the metal body having sufficiently high joining strength while preventing occurrence of cracks in the ceramic body.

On the other hand, when the heating temperature T2 was set to 500° C. which is lower than Tm×0.3, or set to 760° C. which is higher than Tm×0.45, cracks were detected in the ceramic body. Accordingly, to join the ceramic body and the metal body together while preventing occurrence of cracks in the ceramic body, the heating temperature T2 in the second electrical heating step is set higher than Tm×0.3 and lower than Tm×0.45. Preferably, the heating temperature T2 is set higher than Tm×0.32. When the metal body is made of Ti as is the case with this embodiment, the heating temperature T2 in the second electrical heating step is preferably set between 550 and 750° C.

It was found that cracks occur easily in the ceramic body when the heating time period in the second electrical heating step is set shorter than 5 seconds. This may because the ceramic body and the metal body cannot be sufficiently mixed with each other. Accordingly, the heating time period at the temperature of T2 is preferably set longer than 5 seconds. More preferably, it is set longer than 8 seconds. However, since the productivity is lowered with the increase of the heating time period, it is preferable to shorten the heating time period at the temperature of T2 as much as possible. Accordingly, the heating time period at the temperature of T2 is preferably shorter than 20 seconds, more preferably shorter than 15 seconds, and even more preferably shorter than 12 seconds.

Next, the heating temperature and heating timing period in the first electrical heating step were studied. Specifically, the method of manufacturing the joint body 1 was performed for each of four cases where the target temperature T1 was set to 300° C., 350° C., 400° C. and 450° C., respectively. In the second electrical heating step, the abutment surface 11 was heated at the temperature of T2 (650° C.) for 5 to 8 seconds. The third electrical heating step was performed setting the heating temperature of the abutment surface 11 to 925° C. and setting the heating time period to 4 seconds. The other settings were unchanged from those described above. The shear strengths of the obtained joint bodies were measured. As a result, it was found that the shear strength does not change much by changing the target temperature T1 in the first electrical heating step, and is much the same as that (approximately 390 N) in the case of the heating temperature in the third electrical heating step being set to 925° C. Further, it was confirmed by visual inspection that no cracks are present in the ceramic body 2. In this embodiment, the metal body is made of Ti, and the recrystallization temperature thereof is approximately 500° C. Accordingly, the abutment surface 11 was heated in the first electrical heating step to the temperature T1 which is between Tr-220 and Tr-50. It was confirmed that it is possible to obtain the joint body having a sufficient joining strength while preventing occurrence of cracks by setting the heating temperature T1 in the first electrical heating step within this temperature range.

On the other hand, when the heating temperature T1 in the first electrical heating step was set to 270° C. which is lower than Tr-220 or set to 460° C. which is higher than Tr-50, cracks were found in the ceramic body joined with the metal body. Accordingly, to join the ceramic body and the metal body together while preventing occurrence of cracks in the ceramic body, the target temperature T1 in the first electrical heating step is set higher than Tr-220 and lower than Tr-50. When the metal body is made of Ti as is the case with this embodiment, the target temperature T1 in the first electrical heating step is preferably set between 280 and 450° C.

It was found that cracks easily occur in the ceramic body when the heat-up period in which the target temperature T1 is achieved is set shorter than 10 seconds. Accordingly, the heat-up period is preferably set longer than 10 seconds, and more preferably set longer than 12 seconds. However, since the productivity is lowered with the increase of the heating time period, it is preferable to shorten the heat-up time as much as possible. Specifically, the heat-up time is preferably shorter than 30 seconds, and more preferably shorter than 20 seconds.

As explained above, by successively performing the first to third electrical heating steps while satisfying predetermined heating conditions, it is possible to join the ceramic body 2 and the metal body 3 together at a high joining strength without causing cracks in the ceramic body 2. It was confirmed by using a scanning electron microscope that there is formed a diffusion region having a width of several µm (not shown) where the ceramic elements (Si) of the ceramic body 2 and the metal elements (Ti) of the metal body 3 are diffused with each other in the vicinity of the joint interface of the ceramic body 2 and the metal body 3.

In this embodiment, the temperature control can be performed easily in each of the first to third electrical heating steps since the heating temperature is controlled by adjusting the current passed to the abutment surface 11 of the ceramic body 2 and the metal body 3 (see FIG. 3).

In this embodiment, the ceramic body 2 is composed mostly of SiC—Si composite material, and the metal body is composed mostly of Ti. Accordingly, the joint body is resistant to occurrence of cracks in the ceramic body and to breakage of the junction. Hence, the joint body of this embodiment is suitable for use under high temperature. The reason of resistance to breakage of the junction is not only a small difference in linear expansion coefficient between the ceramic body 2 and the metal body 3, but also the diffusion region formed in the joint interface of the ceramic body 2 and the metal body 3. Since the value of the linear expansion coefficient of the diffusion region is between the values of the linear expansion coefficients of the ceramic body 2 and the metal body 3, the junction can be prevented from being broken due to the difference in thermal expansion between the ceramic body 2 and the metal body 3.

The metal body 3 is made mostly of Ti in this embodiment. However, the metal body 3 may be made mostly of any of Ti, Cr, Ni, Fe, Cu, Nb, Ta, Mo, Ge, Ir, Pt, W or Zr, or may be made mostly of an alloy of any of these metals. The ceramic body 2 is made of a SiC—Si composite material in this embodiment. However, the ceramic body may be made mostly of conductive ceramic selected from SiC, SiC—Si composite material, TiC/N, WC, TaC, MoC, NbC, $B_4C$ and VC.

Second Embodiment

Next, a second embodiment of the invention is described. The second embodiment is for joining an additional member 5 to the surface of the metal body 2 opposite the abutment surface 11 of the metal body 2 and the ceramic body 3. This surface is referred to as "opposite surface 31" hereinafter. In the second embodiment, the ceramic body 2 and the metal body 3 are abutted on each other, and joined to each other at the abutment surface 11 by electrical heating as in the first embodiment. In this embodiment, the member 5 is placed on the opposite surface 31, and electrical heating is performed.

Figure 7:
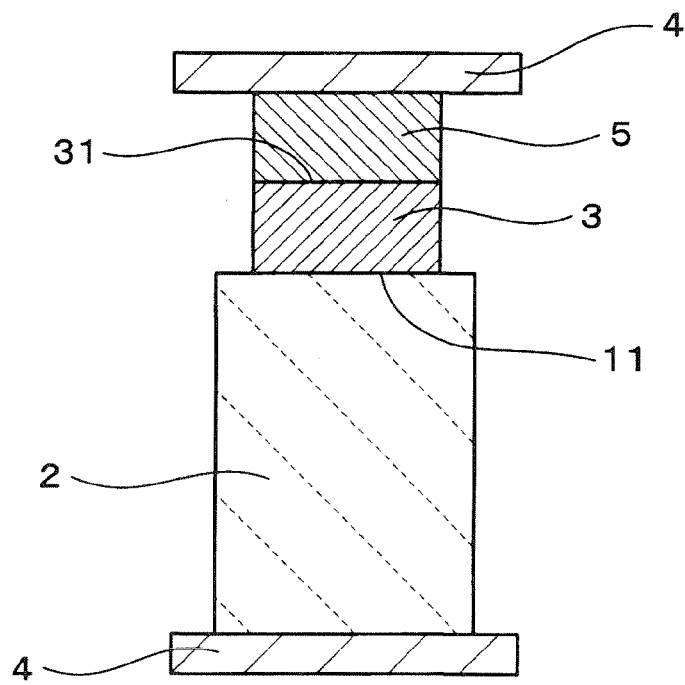
FIG. 7 is a diagram explaining how a ceramic body and a metal body which is abutted or joined with an additional member are joined together by electrical heating in a method according to a second embodiment of the invention.

More specifically, as shown in FIG. 7, the ceramic body 2, the metal body and the additional member 5 are disposed in this order between the pair of the electrodes 4. In this embodiment, the metal body 3 and the member 5 may be joined to each other by conductive adhesive, or may be only abutted on each other without being joined to each other. To join them together by electrical heating, all of the ceramic body 2, the metal body 3 and the member 5 have to be made of conductive material. For example, the ceramic body 2 may be made of SiC—Si composite material, the metal body 3 may be made of Ti and the member 5 may be made of Ni alloy.

A current is passed between the electrodes 4 to heat the abutment surface 11 in the same conditions as the first embodiment to join the ceramic body 2 and the metal body 3 together. In a case where the metal body 3 and the additional member 5 are joined together before passing the current to the abutment surface 11, it is possible to join the ceramic body 2 and the metal body 3 to each other at the abutment surface 11 while keeping the metal body 3 and the member 5 joined together. In a case where the metal body 3 and the additional member 5 are only abutted on each other before passing the current to the abutment surface 11, it is possible to join the ceramic body 2 and the metal body 3 to each other and at the same time join the metal body 3 and the member 5 to each other by performing the electrical heating under the same conditions as the first embodiment. Other than the above, the second embodiment provides the same advantages as those provided by the first embodiment.

Third Embodiment

Figure 8:
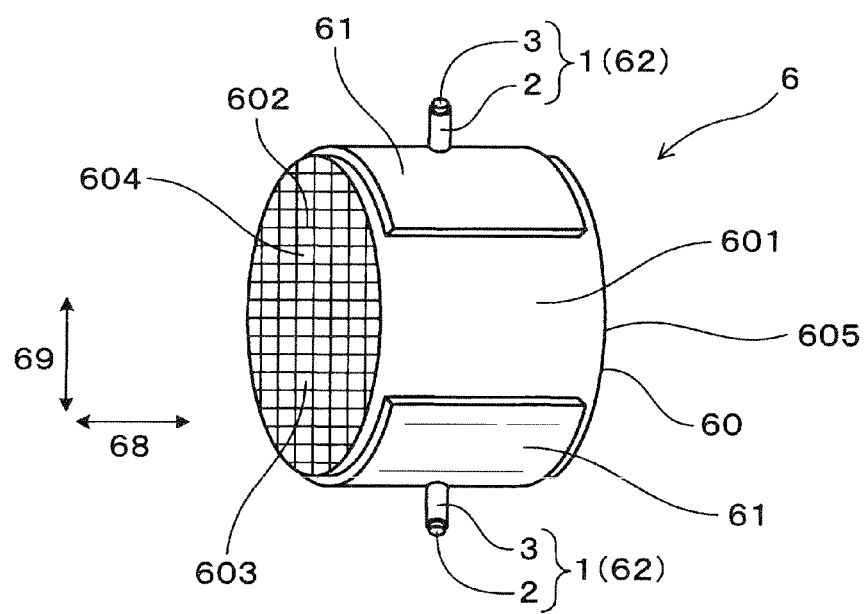
FIG. 8 is a perspective view of an electric heating catalyst including, as electrode terminals thereof, joint bodies of a ceramic body and a metal body manufactured by the method according to the first embodiment of the invention.

Next, a third embodiment of the invention is described. The third embodiment describes an application of the joint body 1 manufactured by the method according to the first embodiment to a vehicle-mounted part. In this embodiment, the vehicle-mounted part is an electrode terminal of an EHC (Electric Heating Catalyst) 6 to be disposed in an exhaust gas passage. As shown in FIG. 8, the EHC 6 includes a honeycomb structure 60 having a cylindrical shape, a pair of electrodes 61 provided on an outer peripheral wall 601 forming a lateral side of the honeycomb structure 60 and two electrode terminals 62 connected to the electrodes 61.

More specifically, the honeycomb structure 60 includes the outer peripheral wall 601 having a tubular shape, a partition wall 602 having a square grid shape and disposed inside the outer peripheral wall 601, and a plurality of cells 603 formed by the partition wall 602 so as to have a square cross section in the radial direction 69 of the honeycomb structure 60. The honeycomb structure 60 is a cylindrical porous body made of conductive ceramic composed mostly of SiC—Si composite material in which Si is impregnate in SiC. In this embodiment, the cell 603 is square-shaped. That is, the cross-sectional shape of the cell 603 in the radial direction of the honeycomb structure 60, and the shape of the cell 603 at each of end surfaces 604 and 605 in the axial direction 68 of the honeycomb structure 60 are square. However, the cell 603 may be circle-shaped, triangle-shaped, hexagon-shaped, or octagon-shaped. The porosity of the honeycomb structure 60 may be between 10 and 70%.

The honeycomb structure 60 may be provided with a catalyst made of noble metal and having exhaust purifying function at the partition wall 602 or in its pores. The catalyst may be a three-way catalyst made of Pt, Pd and Rh, for example. Exhaust gas flows into honeycomb structure 60 from the end surface 604, and exits from the end surface 605 after passing through the cells 603.

As shown in FIG. 8, the pair of the electrodes 61 are provided on the outer peripheral wall 601 of the honeycomb structure 60. These electrodes 61 are formed at opposite places in the radial direction 69 of the honeycomb structure 60. Each electrode 61 is made of conductive ceramic composed mostly of SiC—Si composite material. Each electrode 61 is formed in a plate shape having a uniform thickness along the circumferential direction of the cylindrical outer peripheral wall 601.

The electrodes 61 are joined to the outer peripheral wall 601 of the honeycomb structure 60 through a conductive adhesive (not shown). The conductive adhesive may be an adhesive containing the SiC—Si composite material, carbon and binder. Each electrode 61 is provided with the electrode terminal 62. As the electrode terminal 62, the joint body 1 of the ceramic body 2 and the metal body 3 manufactured by the method according to the first embodiment is used.

More specifically, the joint body 1 used as the electrode terminal 62 is the one manufactured by setting the heating temperature in the third electrical heating step to 925° C. to have the shear strength of 340 N (see FIG. 4). However, other joint bodies 1 manufactured by the method according to the first embodiment which exhibit a high joining strength and have no cracks can be used as the electrode terminal 62. Further, the joint body of the ceramic body 2, the metal body 3 and the additional member 5 manufactured by the method according to the second embodiment can be used as the electrode terminal 62. In this embodiment, the junction body 1 (electrode terminal 62) is joined to the electrode 61 at the side of the ceramic body 2. The joint body 1 and the electrode 61 can be joined to each other using the foregoing adhesive. The EHC 6 is housed in a metal case (not shown) or the like and mounted in the exhaust gas passage.

The joint body 1 used as the electrode terminal 62 is excellent in joining strength as explained in the first embodiment. Accordingly, the joint body 1 can be used as a reliable vehicle-mounted part because the junction 15 is highly vibration resistant. Further, the ceramic body 2 and the metal body 3 are directly joined to each other without interposition of brazing material or the like which is not resistant to high temperature. Accordingly, the joint body 1 can be mounted in an exhaust gas passage which may be exposed to high temperature of above 500° C.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a joint body of a conductive ceramic body and a conductive metal body comprising:
   an abutting step of abutting the ceramic body and the metal body on each other; and
   a joining step of joining the ceramic body and the metal body to each other by applying a voltage between the ceramic body and the metal body to pass a current to an abutment surface between the ceramic body and the metal body to thereby heat the abutment surface,
   wherein the joining step includes:
   a first electrical heating step of heating up the abutment surface to a predetermined temperature T1 within a temperature range between $(Tr-220)°$ C. and $(Tr-50)°$ C. in a period longer than 10 seconds, Tr being a recrystallization temperature of the metal body;
   a second electrical heating step of increasing the temperature of the abutment surface from the temperature of T1 and heating the abutment surface for a period longer than 5 seconds at a predetermined temperature T2 within a temperature range between $Tm \times 0.3°$ C. and $Tm \times 0.45°$ C., Tm being a melting point of the metal body; and
   a third electrical heating step of increasing the temperature of the abutment surface from the temperature of T2 and heating the abutment surface for a period longer than 3 seconds at a heating temperature higher than $Tm \times 0.48°$ C. and lower than $Tm \times 0.6°$ C.

2. The method of manufacturing a joint body according to claim 1, wherein the temperature T1 is between 280 and 450° C., the temperature T2 is between 550 and 750° C., and the heating temperature in the third electrical heating step is between 820 and 950° C.

3. The method of manufacturing a joint body according to claim 2, wherein the heating temperature in the third electrical heating step is between 875 and 950° C.

4. The method of manufacturing a joint body according to claim 1, wherein, in each of the first to third electrical heating steps, control of heating temperature is performed by controlling the current passed to the abutment surface.

5. The method of manufacturing a joint body according to claim 1, wherein the ceramic body is made mostly of SiC or SiC—Si composite material, and the metal body is made mostly of Ti or Ti-alloy.

6. The method of manufacturing a joint body according to claim 1, wherein an additional conductive member is joined to or abutted on a surface of the metal body opposite to the abutment surface of the metal body and the ceramic body.

7. The method of manufacturing a joint body according to claim 1, wherein the joint body is a vehicle mounted part to be mounted in an exhaust gas passage.

* * * * *